United States Patent

Bennett et al.

[11] Patent Number: 5,325,065
[45] Date of Patent: Jun. 28, 1994

[54] DETECTION CIRCUIT WITH DUMMY INTEGRATOR TO COMPENSATE FOR SWITCH CHARGE INSECTION AND AMPLIFIER OFFSET VOLTAGE

[75] Inventors: Paul T. Bennett, Phoenix; David F. Mietus, Tempe, both of Ariz.

[73] Assignee: Motorola, Inc., Schaumburg, Ill.

[21] Appl. No.: 884,978

[22] Filed: May 18, 1992

[51] Int. Cl.$^5$ .............................. G01P 15/08
[52] U.S. Cl. .................... 324/661; 324/684; 73/517 B; 328/162
[58] Field of Search .......... 73/517 B; 307/542, 542.1, 307/572; 324/661, 684, 686; 328/127, 162; 364/571.01

[56] References Cited

U.S. PATENT DOCUMENTS

| | | | |
|---|---|---|---|
| 4,163,947 | 8/1979 | Weedon | 328/128 |
| 4,211,981 | 7/1980 | Lerma | 328/127 |
| 4,364,028 | 12/1982 | Masuda et al. | 324/99 D X |
| 4,365,204 | 12/1982 | Haque | 328/127 |
| 4,656,871 | 4/1987 | Czarnocri | 73/708 X |
| 5,028,876 | 7/1991 | Caldwell | 324/661 X |
| 5,095,750 | 3/1992 | Suzuki et al. | 73/517 B |

Primary Examiner—Kenneth A. Wieder
Assistant Examiner—Christopher M. Tobin
Attorney, Agent, or Firm—Michael D. Bingham; Bradley J. Botsch, Sr.

[57] ABSTRACT

A detection circuit for sensing small capacitive changes has been provided. The detection circuit includes a dummy integrator stage that compensates for a voltage step that results from charge injection due to an existing switch in a first integrator stage. As a result, the detection circuit is insensitive to switch injection and amplifier offset voltages.

5 Claims, 3 Drawing Sheets

DETECTION CIRCUIT WITH DUMMY
INTEGRATOR TO COMPENSATE FOR SWITCH
CHARGE INSECTION AND AMPLIFIER OFFSET
VOLTAGE

FIELD OF THE INVENTION

This invention relates to detection circuits, and in particular, a detection circuit for sensing small capacitive changes while utilizing dummy integration to provide insensitivity to switch injection.

BACKGROUND OF THE INVENTION

Detecting small capacitive changes may be necessary such as in an application for controlling an accelerometer sensor. For example, the detection circuit must be able to detect small differential capacitances in order to provide an output logic signal to control the accelerometer sensor.

However, if the detection circuit includes switches, charge injection induced by the opening of any switches will introduce error within the detection circuit. Further, this error may be substantial enough to cause the detection circuit to provide an erroneous output logic signal especially when detecting small capacitive changes.

Hence, there exists a need for a detection circuit for detecting small capacitive changes that are insensitive to the effects of charge injection due to switches.

SUMMARY OF THE INVENTION

Briefly, there is provided a detection circuit having an input responsive to a signal for providing an output comprising a first integrator circuit having an input and an output. The input of the first integrator circuit is coupled to the input of the detection circuit. The first integrator circuit further includes a first switch for enabling the first integrator circuit when the first switch is opened.

A second integrator circuit having an output is also included. The second integrator circuit is matched to the first integrator circuit such that the output of the second integrator circuit provides a signal for simulating charge injection effects of the first switch of the first integrator circuit. The second integrator circuit further includes a second switch which is operated in conjunction with the first switch.

A comparator circuit compares the output of the first integrator circuit with the output of the second integrator circuit and provides an output signal. A flip flop circuit has a clock and data input and an output. The data input of the flip flop is coupled to the output of the comparator circuit. The clock input of the flip flop circuit is coupled to receive a latch signal. The output of the flip flop circuit is coupled to the output of the detection circuit wherein the flip flop circuit is clocked by the latch signal after the first and second switches are enabled.

The present invention will be understood from the following detailed description taken in conjunction with the accompanying drawings.

DETAILED DESCRIPTION OF THE DRAWINGS

Figure 1:
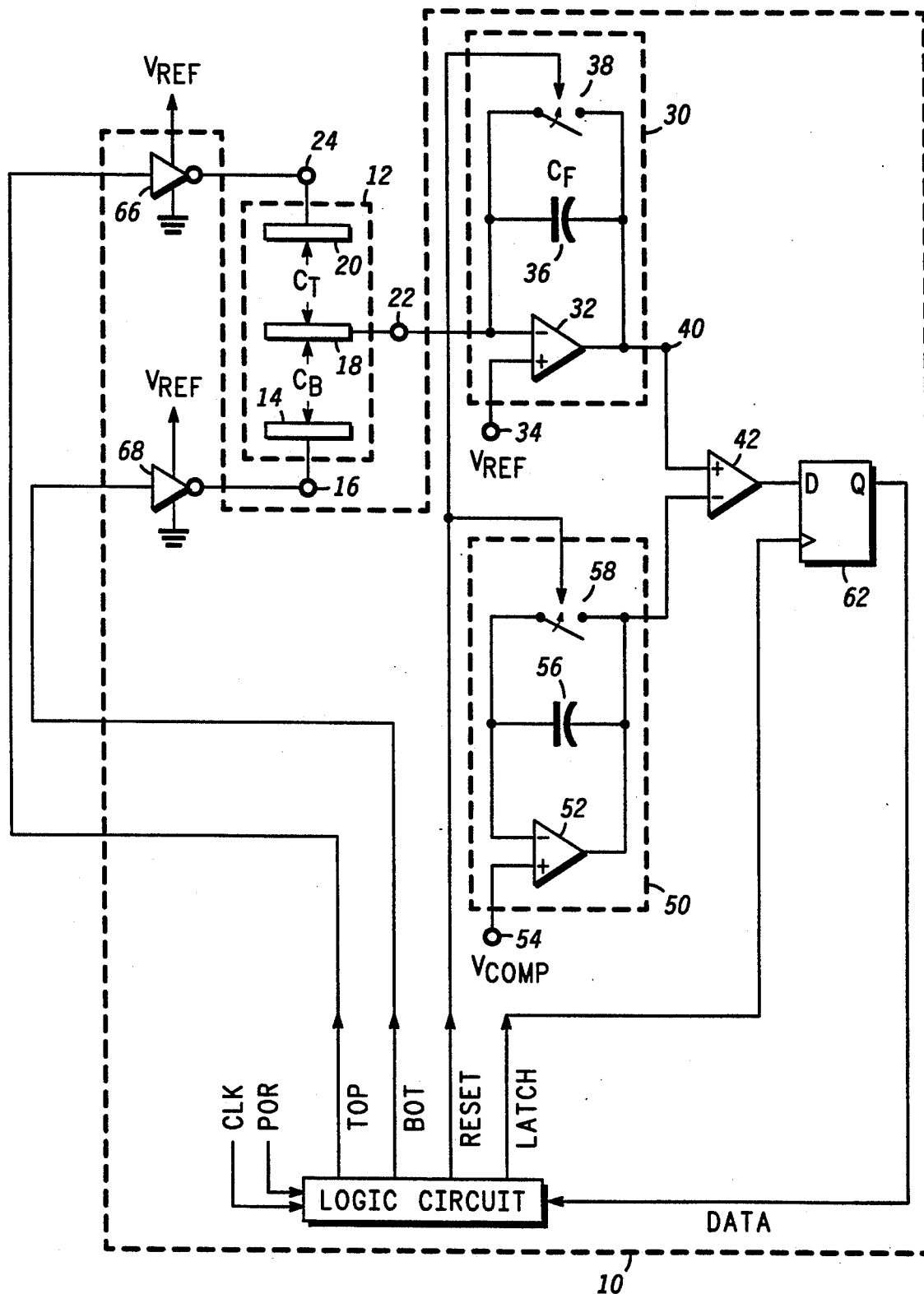
FIG. 1 is a partial schematic/block diagram illustrating a detection circuit for sensing small capacitive changes occurring within an accelerometer sensor in accordance with the present invention.

Referring to FIG. 1, a partial schematic/block diagram illustrating detection circuit 10 for sensing small capacitive changes occurring within accelerometer sensor 12 is shown. Accelerometer sensor 12 is essentially a differential capacitive sensor which is a surface micro-machined device consisting of three electrically isolated layers of polysilicon. First layer 14 is rigidly attached to a substrate but is electrically isolated from the substrate by an oxide layer. First layer 14 forms the bottom plate of a three layer capacitor and is coupled to terminal 16. Second layer 18 is sandwiched between first layer 14 and third layer 20 and is typically supported by a set of supports connected to the first layer. Second layer 18 forms the middle plate of the three layer capacitor and is coupled to terminal 22. Third layer 20 is over top the first two layers and is supported in such a manner as to remain rigid. The third layer forms the top plate of the three layer capacitor and is coupled to terminal 24. It is understood that the three layers (14, 18 and 20) inherently form two capacitors; 1) a top capacitor denoted by $C_T$ appearing between layers 18 and 20, and 2) a bottom capacitor denoted by $C_B$ appearing between layers 14 and 18 wherein middle plate 18 is a common plate to both capacitors. Further, middle plate 18 is free to move in response to an applied force. Thus, an applied force may cause middle plate 18 to move towards top plate 20 or bottom plate 14 and, thus, produce a perceptible change in the capacitances of $C_T$ and $C_B$. For example, an electrostatic force generated by a voltage source can cause motion of the middle plate. Likewise, an applied accelerating force will also cause middle plate 18 to move.

Detection circuit 10 includes integrator 30 which includes operational amplifier 32 which has an inverting input coupled to terminal 22 and a non-inverting input coupled to terminal 34 at which the reference voltage $V_{REF}$ is applied. The output of op amp 32 is coupled through feedback capacitor 36 ($C_F$) back to the inverting input of op amp 32. Likewise, the output of op amp 32 is coupled through switch 38 back to the inverting input of op amp 32. The output of op amp 32 is coupled to circuit node 40 the latter being coupled to a non-inverting input of comparator 42.

Detection circuit 10 also includes dummy integrator 50 which includes op amp 52 having a non-inverting input coupled to terminal 54 at which the voltage $V_{COMP}$ is applied. An output of op amp 52 is coupled through feedback capacitor 56 to an inverting input of op amp 52. The output of op amp 52 is further coupled via switch 58 back to the inverting input of op amp 52. Further, the output of op amp 52 is coupled to an inverting input of comparator 42.

The output of comparator 42 is coupled to a data input of flip flop 62 the latter having an output coupled to provide signal DATA to logic circuit 64. Logic circuit 64 provide signal LATCH to the clock input of flip flop 62. The control inputs of switches 38 and 58 both are coupled to receive signal RESET via logic circuit 64. Additionally, logic circuit 64 provides signals TOP and BOT to the respective inputs of inverters 66 and 68. The outputs of inverters 66 and 68 are respectively coupled to terminals 24 and 16. Further, as shown inverters 66 and 68 operate between voltage $V_{REF}$ and ground reference.

Detection circuit 10 is responsive to two complementary voltage step input signals which are applied to the inputs of inverters 66 and 68 via complementary signals TOP and BOT, respectively. For example, a positive edge is applied to top capacitor plate 20 and a negative edge is applied to bottom capacitive plate 14. The net current generated at middle plate 18 is then integrated across feedback capacitor 36 thereby producing a voltage step at circuit node 40 which is proportional to the difference between capacitors $C_T$ and $C_B$. In particular, the voltage appearing at circuit node 40 ($V_{40}$) due to the net current generated at middle plate 18 as a result of the transitions occurring on signals TOP and BOT can be expressed as shown in EQN. 1.

$$V_{40} = \{[(C_T - C_B)/C_F] \times V_F\} u(t) \qquad \text{EQN. 1}$$

where $V_F$ denotes the voltage swing of signals TOP and BOT; and $u(t)$ denotes a unit step function.

Thus, a step function appears at circuit node 40 having magnitude of $\{(C_T - C_B)/C_F \times V_F\}$ wherein the step occurs upon the transition of signals TOP and BOT (provided that integrator 30 is enabled as will be discussed hereinafter).

When switch 38 is closed, integrator 30 is disabled and the voltage appearing at circuit node 40 is substantially equal to voltage $V_{REF}$ plus any input offset voltage of op amp 32. However, when switch 38 opens, integrator 30 is enabled. Due to the stored charges within switch 38, current is injected into (or out of) the inverting input of op amp 32 and is collectively summed over time (i.e. integrated) and converted to a step voltage at the output of integrator 30. Thus, upon the opening of switch 38, an error current is injected at the inverting input of op amp 32 due to the stored charges within switch 38, and this charge injection results in an undesirable voltage step that appears at circuit node 40 wherein this voltage step occurs at the time switch 38 is opened. This undesirable voltage step can cause erroneous results by detection circuit 10 because it interferes with the voltage step produced by the net current at middle plate 18 due to transitions of signals TOP and BOT as aforedescribed. this is especially true when small capacitive changes are trying to be detected from accelerometer sensor 12.

The present invention, however, provides dummy integrator 50 which is fabricated alongside integrator 30 in order to provide a replica of integrator 30. It is important to realize that no signal is fed into dummy integrator 50 since the inverting input of op amp 52 is not coupled to terminal 22. In this manner, dummy integrator 50 simulates the charge injection effects that occur in integrator 30 due to switch 38. Further, it should be understood that switch 58 is identical to switch 38 and is opened and closed in substantially the same manner as switch 38 via signal RESET. Further, capacitor 56 and op amp 52 are respectively matched to capacitor 36 and op amp 32. As a result, a voltage step appears at the output of op amp 52 upon the opening of switch 58 which is substantially equal to the voltage step appearing at circuit node 40 upon the opening of switch 38. Thus, dummy integrator 50 has replicated the voltage step that has appeared at circuit node 40 due to switch 38, which can be subtracted from the overall signal appearing at circuit node 40 thereby eliminating the effect of the charge injection due to switch 38.

As shown in FIG. 1, the outputs of integrators 30 and 50 are coupled to the inputs of comparator 42 which is sensitive to a differential voltage. If the voltage at the output of integrator 30 is less than the voltage at the output of dummy integrator 50, then the output of comparator 42 is a logic zero. This means that capacitor $C_T < C_B$ and that middle plate 18 is closer to bottom plate 14 than it is to top plate 20. Further, upon the clocking of flip flop 62 via signal LATCH, signal DATA will be at a logic low state. This will cause logic circuit 64 to provide logic signals TOP and BOT so as to provide respective voltages at terminals 24 and 16 so as to move middle plate 18 towards top plate 20 for a longer time than it is moved towards bottom plate 14. For example, if the voltage applied at terminal 24 via signal TOP is at ground reference longer than it is at voltage $V_{REF}$, while the voltage applied at terminal 16 via signal BOT is at voltage $V_{REF}$ longer than it is at ground reference, then the net effect is that middle plate 18 will be moved towards top plate 20.

In general, it is worth noting that when terminal 24 is at ground reference and terminal 16 is at voltage $V_{REF}$, a force is applied to middle plate 18 to move it towards top plate 20 because middle plate 18 is held at voltage $V_{REF}$ via op amp 32. However, when the voltage applied at terminal 24 is voltage $V_{REF}$ and the voltage applied at terminal 16 is ground reference, a force is applied to middle plate 18 to move it towards bottom plate 14. In particular, when signal DATA is a logic zero, it is desired to have the voltage appearing at terminal 24 (via signal TOP) to be at ground reference longer than it is at voltage $V_{REF}$ and, correspondingly, it is desired to have the voltage appearing at terminal 16 (via signal BOT) to be at voltage $V_{REF}$ longer than it is at ground reference. This may be accomplished by setting the duty cycle of signals TOP and BOT to a predetermined value. It should be realized that this is necessary because a force is always applied to move middle plate 18 closer to top plate 18 or closer to bottom plate 16 via signals TOP and BOT depending upon their logic levels as aforedescribed.

It is worth noting that voltage $V_{COMP}$ applied at terminal 54 is typically set equal to voltage $V_{REF}$. However, it should be understood that voltage $V_{COMP}$ may be adjusted either above or below voltage $V_{REF}$ to offset any voltage mismatches that may exist between integrators 30 and 50 as well as any voltage offset of comparator 42. In this manner, the offset voltages of all three amplifiers can be compensated by a single adjustment.

Figure 2:
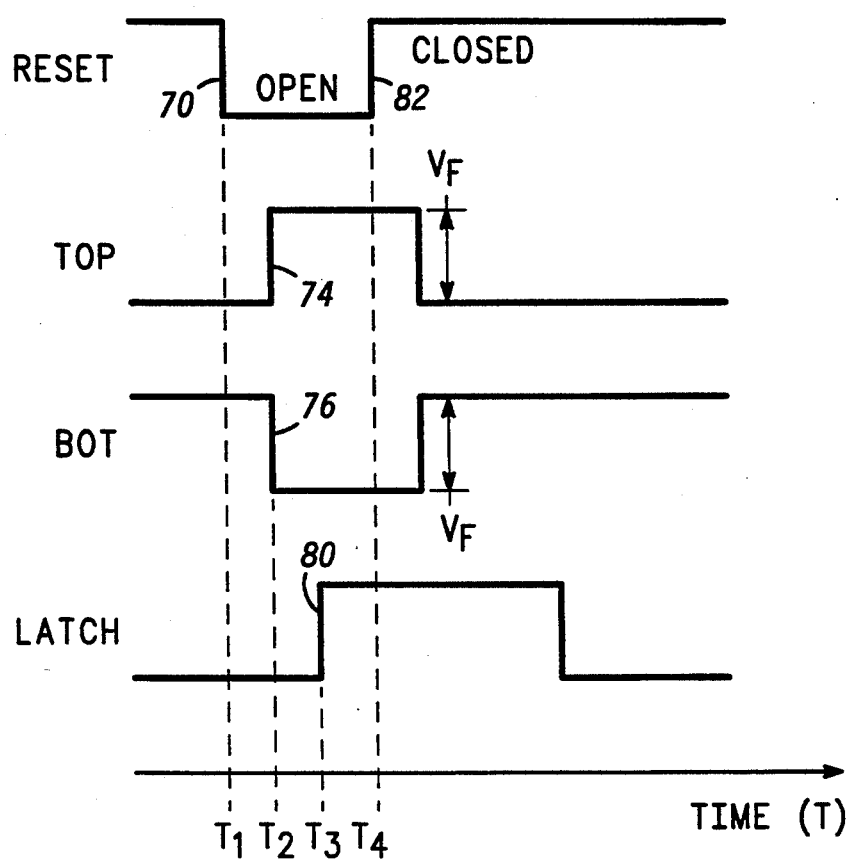
FIGS. 2 and 3 are graphical diagrams illustrating typical waveforms appearing within the detection circuit shown in FIG. 1.
Figure 3:
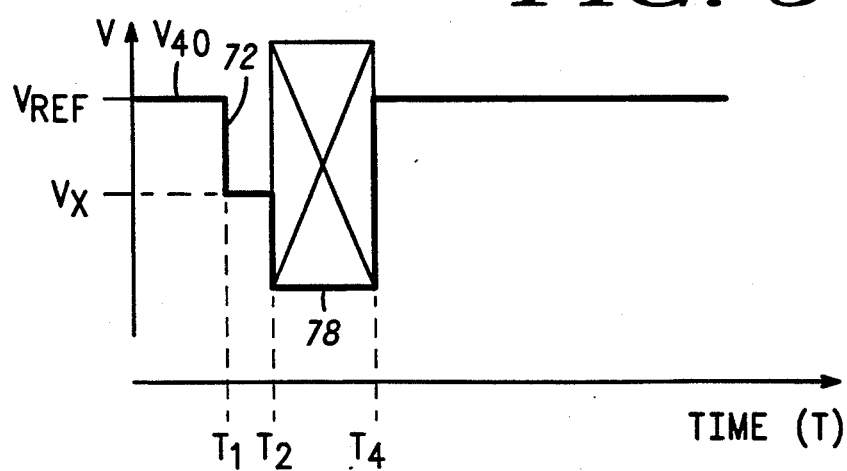

Referring to FIGS. 2 and 3, graphical diagrams illustrating typical waveforms appearing within detection circuit 10 are shown. Upon the opening of switches 38 and 58, which occurs at time $T_1$ as indicated by transition 70 of signal RESET as shown in FIG. 2, the voltage appearing at circuit node 40 steps from voltage $V_{REF}$ to voltage $V_X$ as denoted by transition 72 of signal $V_{40}$ of FIG. 3. It is understood that voltage $V_X$ is shown as being less than voltage $V_{REF}$, but this may not always occur and is dependent upon the charges stored in switch 38.

After a predetermined time of opening switches 38 and 58 but before closing these switches, transitions 74 and 76 will appear on signals TOP and BOT, respectively. This occurs at time $T_2$. As a result, at time $T_2$ another step will occur at circuit node 40 which is due to the net current generated at middle plate 18 due to transitions 74 and 76. This is shown by portion 78 of FIG. 3 wherein it is understood that magnitude and direction of this transition is a function of the distance and direction that middle plate 18 has moved since the last transition of signals TOP and BOT.

Signal LATCH transitions from a logic high to a logic low as indicated by transition 80 at time time $T_3$ which must occur when switches 38 and 58 are still open. Upon the transition 80 of signal LATCH, flip flop 62 will provide a logic signal to logic circuit 64 indicative of whether capacitor $C_T$ is greater than or less than capacitor $C_B$ as aforedescribed. Since the signal appearing at circuit node 40 is compared with the output signal of integrator 50, the voltage error induced by switch 38 is cancelled out and, thus, the output of comparator 42 is an accurate indication of whether the voltage appearing at circuit 40 is above or below reference voltage $V_{REF}$. This allows detection circuit 10 to sense small differential changes of capacitors $C_T$ and $C_B$ without being affected by the charge injection due to switch 38.

Finally, when switches 38 and 58 are closed as indicated at time $T_4$ by transition 82, the voltage appearing at circuit node 40 returns back to voltage $V_{REF}$ as shown in FIG. 3.

Figure 4:
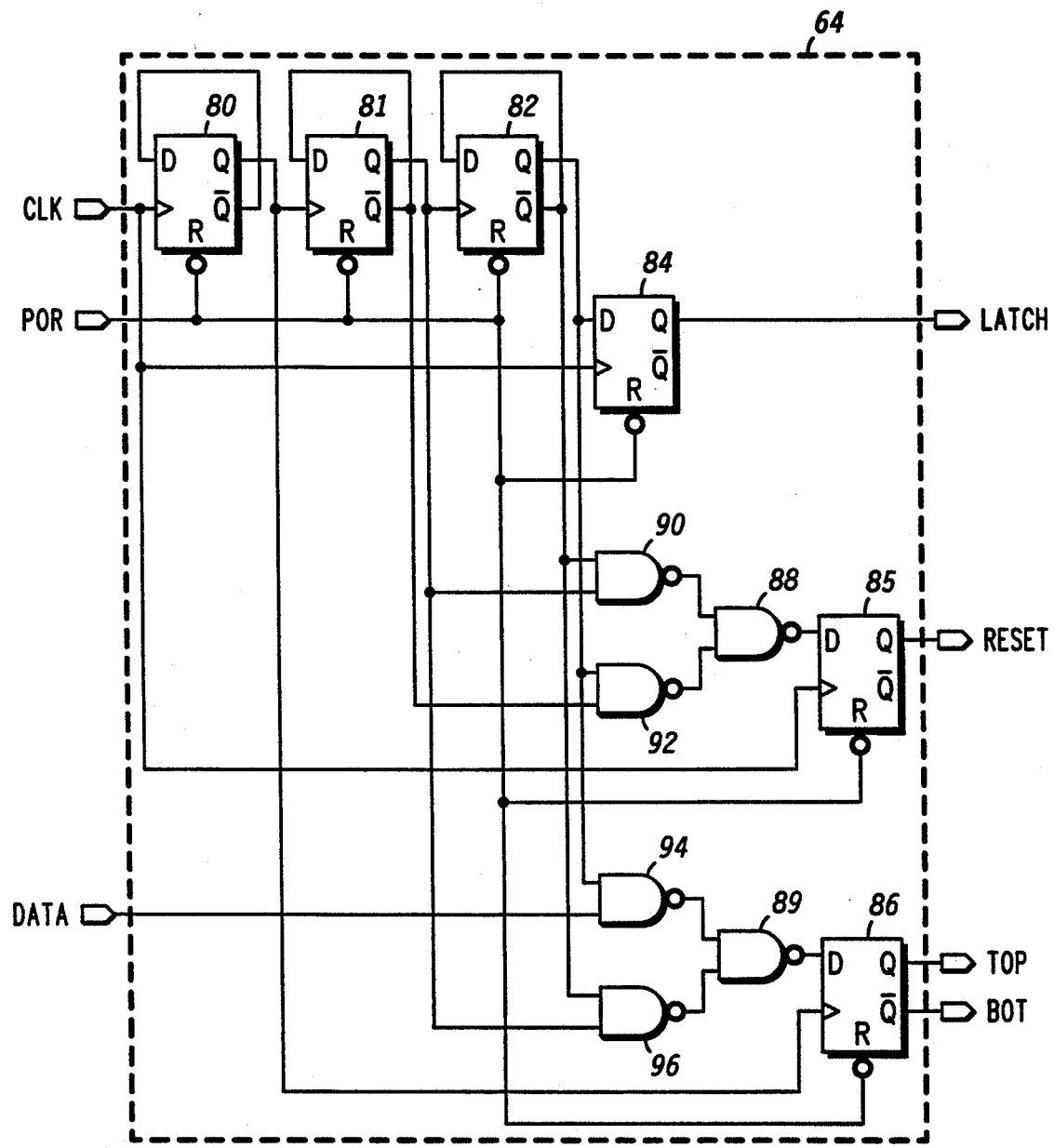
FIG. 4 is a detailed logic diagram illustrating at least one implementation of the logic circuit shown in FIG. 1.

Referring to FIG. 4, a detailed logic diagram illustrating at least one implementation of logic circuit 64 is shown. The circuit illustrated in FIG. 4 shows a traditional state machine approach for generating synchronous logic signals. The circuit of FIG. 4 includes flip flops 80-82 each configured in a divide by two mode wherein the inverting output of each is coupled back to its respective data input. The clock input of flip flop 80 is coupled to receive a clock input (signal CLK) while the noninverting output of flip flop 80 is coupled to the data input of flip flop 81. Likewise, the noninverting output of flip flop 81 is coupled to the data input of flip flop 82. Also, the reset of flip flop 80-82 are coupled to receive a power-on reset signal (POR).

Flip flops 84-86 provide latched signals LATCH, RESET, and TOP and BOT. In particular, the clock inputs of flip flops 84 and 85 are coupled to receive signal CLK, while the clock input of flip flop 86 is coupled to the noninverting output of flip flop 84. The reset input of flip flops 84-86 are coupled to receive signal POR. The data input of flip flop 84 is coupled to a noninverting output of flip flop 82, while a noninverting output of flip flop 84 provides signal LATCH. The data input of flip flop 85 is coupled to an output of NAND gate 88, while a noninverting output of flip flop 85 provides signal RESET. The data input of flip flop 86 is coupled to an output of NAND gate 89, while noninverting and inverting outputs of flip flop 86 respectively provide signals TOP and BOT. It is worth noting that flip flops 80-86 are positive edge triggered.

NAND gate 90 has first and second inputs respectively coupled to the inverting output of flip flop 82 and the noninverting output of flip flop 81. NAND gate 92 has first and second inputs respectively coupled to the noninverting output of flip flop 82 and the inverting output of flip flop 81. Further, the outputs of NAND gates 90 and 92 are coupled to inputs of NAND gate 88.

NAND gate 94 has first and second inputs respectively coupled to receive signal DATA and to the noninverting output of flip flop 82. NAND gate 96 has first and second inputs respectively coupled to the inverting output of flip flop 82 and the noninverting output of flip flop 81. Further, the outputs of NAND gates 94 and 96 are coupled to inputs of NAND gate 89.

By now it should be apparent from the foregoing discussion that a novel detection circuit for sensing small capacitive changes has been provided. The detection circuit includes a dummy integrator stage that compensates for a voltage step that results from charge injection due to an existing switch in a first integrator stage. As a result, the detection circuit is insensitive to switch injection and amplifier offset voltages.

While the invention has been described in conjunction with specific embodiments thereof, it is evident that many alterations, modifications and variations will be apparent to those skilled in the art in light of the forgoing description. Accordingly, it is intended to embrace all such alterations, modifications and variations in the appended claims.

We claim:

1. A detection circuit for sensing small capacitive changes occurring in a capacitive sensor, the capacitive sensor including first, second and third plates, the detection circuit comprising:

a first integrator circuit having an input and an output, said input of said first integrator circuit being coupled to the second plate of the capacitive sensor, said first integrator circuit further including a first switch for enabling said first integrator circuit when said first switch is opened;

a second integrator circuit matched to said first integrator circuit and having an output, said output of said second integrator circuit providing a signal for simulating charge injection effects of said first switch of said first integrator circuit, said second integrator circuit including a second switch which is operated in conjunction with said first switch;

a comparator circuit having first and second inputs and an output, said first input of said comparator circuit being coupled to said output of said first integrator circuit, said second input of said comparator circuit being coupled to said output of said second integrator circuit;

a flip flop circuit having a clock and data input and an output, said data input of said flip flop being coupled to said output of said comparator circuit; and a logic circuit having an input, a clock input and a plurality of outputs, said input of said logic circuit being coupled to said output of said flip flop circuit, said clock input of said logic circuit being coupled to receive a clock signal, said plurality of outputs of said logic circuit being coupled to provide a plurality of output logic signals, said first and second switches being responsive to a first one of said plurality of output signals, said clock input of said flip flop circuit being responsive to a second one of said plurality of outputs, and the first and third plates of the capacitive sensor being respectively responsive to third and fourth ones of said plurality of outputs.

2. The circuit according to claim 1 wherein said first integrator circuit includes:

a first operational amplifier having inverting and non-inverting inputs and an output, said inverting input of said first operational amplifier being coupled to said input of said first integrator circuit, said non-inverting input of said first operational amplifier being coupled to receive a reference voltage, and said output of said first operational amplifier being coupled to said output of said first integrator circuit;

first capacitive means being coupled across said inverting input and said output of said first operational amplifier;

said first switch having first and second terminals and a control terminal, said first terminal of said first switch being coupled to said inverting input of said first operational amplifier, said second terminal of said first switch being coupled to said output of said first operational amplifier, and said control terminal of said first switch being coupled to receive said first one of said plurality of output signals of said logic circuit.

3. The circuit according to claim 2 wherein said second integrator circuit includes:

a second operational amplifier having inverting and non-inverting inputs and an output, said non-inverting input of said second operational amplifier being coupled to receive a compensation voltage, said output of said second operational amplifier being coupled to said output of said second integrator circuit;

second capacitive means being coupled across said inverting input and said output of said second operational amplifier;

said second switch having first and second terminals and a control terminal, said first terminal of said second switch being coupled to said inverting input of said second operational amplifier, said second terminal of said second switch being coupled to said output of said second operational amplifier, and said control terminal of said second switch being coupled to receive said first one of said plurality of output signals of said logic circuit.

4. The circuit according to claim 3 wherein said compensation voltage is adjustable to cancel out any voltage offsets of said first and second operational amplifiers and said comparator circuit.

5. A method for detecting small capacitive changes occurring within a capacitive sensor, the capacitive sensor including first, second and third plates, the method comprising the steps of:

(a) integrating a net current generated at the second plate of the capacitive sensor in response to opening a first switch;

(b) generating a first signal in response to said net current generated in step (a);

(c) simulating charge injection effects of said first switch (d) generating a second signal in response to said simulated charge injection effects of said first switch;

(e) comparing said first signal with said second signal for providing a third signal in order to compensate for said charge injection effects of said first switch; and (f) utilizing said third signal to determine voltages applied to the first and third plates.

* * * * *